(12) United States Patent
Vannan, Jr. et al.

(10) Patent No.: US 6,277,317 B1
(45) Date of Patent: Aug. 21, 2001

(54) METHOD FOR BUILDING PNEUMATIC TIRES IN AN IMPROVED TIRE MOLD

(75) Inventors: Frederick Forbes Vannan, Jr., Clinton; William Allen Rex, Akron; Albert James Yovichin, North Canton; George Michael Stoila, Tallmadge; Harold Aloysius Wolbert, North Canton, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/380,555

(22) PCT Filed: Dec. 3, 1997

(86) PCT No.: PCT/US97/23005

§ 371 Date: Dec. 10, 1999

§ 102(e) Date: Dec. 10, 1999

(87) PCT Pub. No.: WO98/42498

PCT Pub. Date: Oct. 1, 1998

(51) Int. Cl.⁷ .................................................... B29D 30/06
(52) U.S. Cl. ........................ 264/326; 264/334; 425/36; 425/44
(58) Field of Search .................... 264/326, 501, 264/334; 425/36, 40, 44

(56) References Cited

U.S. PATENT DOCUMENTS

| | | | |
|---|---|---|---|
| 1,406,433 | * | 2/1922 | Atcheson ............................... 425/36 |
| 1,942,797 | * | 1/1934 | Bittaker .................................. 425/36 |
| 1,952,424 | | 3/1934 | Day . |
| 1,982,674 | | 12/1934 | Laursen . |
| 2,741,295 | | 4/1956 | Kindle et al. . |
| 2,752,978 | | 7/1956 | Kindle et al. . |
| 2,798,527 | | 7/1957 | Kindle et al. . |
| 2,905,220 | | 9/1959 | Schutz . |
| 3,143,449 | | 8/1964 | Bosomworth et al. . |
| 3,184,794 | * | 5/1965 | Sherkin .................................. 425/36 |
| 3,659,975 | | 5/1972 | Leblond . |
| 3,789,899 | | 2/1974 | Kobayashi . |
| 3,917,791 | * | 11/1975 | Kratochvil et al. .................... 425/36 |
| 3,933,566 | | 1/1976 | Seiberling . |
| 4,022,554 | | 5/1977 | MacMillan . |
| 4,166,883 | | 9/1979 | Seiberling . |
| 4,181,483 | | 1/1980 | Pech et al. . |
| 4,263,074 | | 4/1981 | Price . |
| 4,303,114 | | 12/1981 | Price . |
| 4,582,470 | * | 4/1986 | Sarumaru ............................... 425/36 |
| 4,595,448 | | 6/1986 | Sorioka . |
| 4,604,714 | | 8/1986 | Nixon et al. . |
| 5,024,800 | | 6/1991 | Schmidt et al. . |

FOREIGN PATENT DOCUMENTS

| | | |
|---|---|---|
| 407 537 | 2/1964 | (CH) . |
| 34 42 746 | 5/1986 | (DE) . |
| 40 30 474 | 4/1991 | (DE) . |
| 1049414 | 8/1953 | (FR) . |
| 2050933 | 1/1981 | (GB) . |
| 2224031 | 4/1990 | (GB) . |
| 48-80185 | 2/1972 | (JP) . |

* cited by examiner

Primary Examiner—Mathieu D. Vargot
(74) Attorney, Agent, or Firm—Howard M. Cohn

(57) ABSTRACT

The invention relates to the manufacture of a tire (10) in a bladderless tire mold (12) that incorporates sealing rings (16, 18, 70) that enable the tire (10) to be easily and quickly installed within the tire mold (12) so that the pressurized gas or fluid used to inflate and vulcanize the tire (10) does not leak around the tire bead sections (44, 46) of the tire (10) and escape into the mold cavity (60). An improved method of mounting the tire (10) into the bladderless tire mold (12) allows the tire (10) to be quickly and easily loaded in and unload from the tire mold (12) without the need of moving any mold parts into or out of the space between the tire bead sections (44, 46).

3 Claims, 3 Drawing Sheets

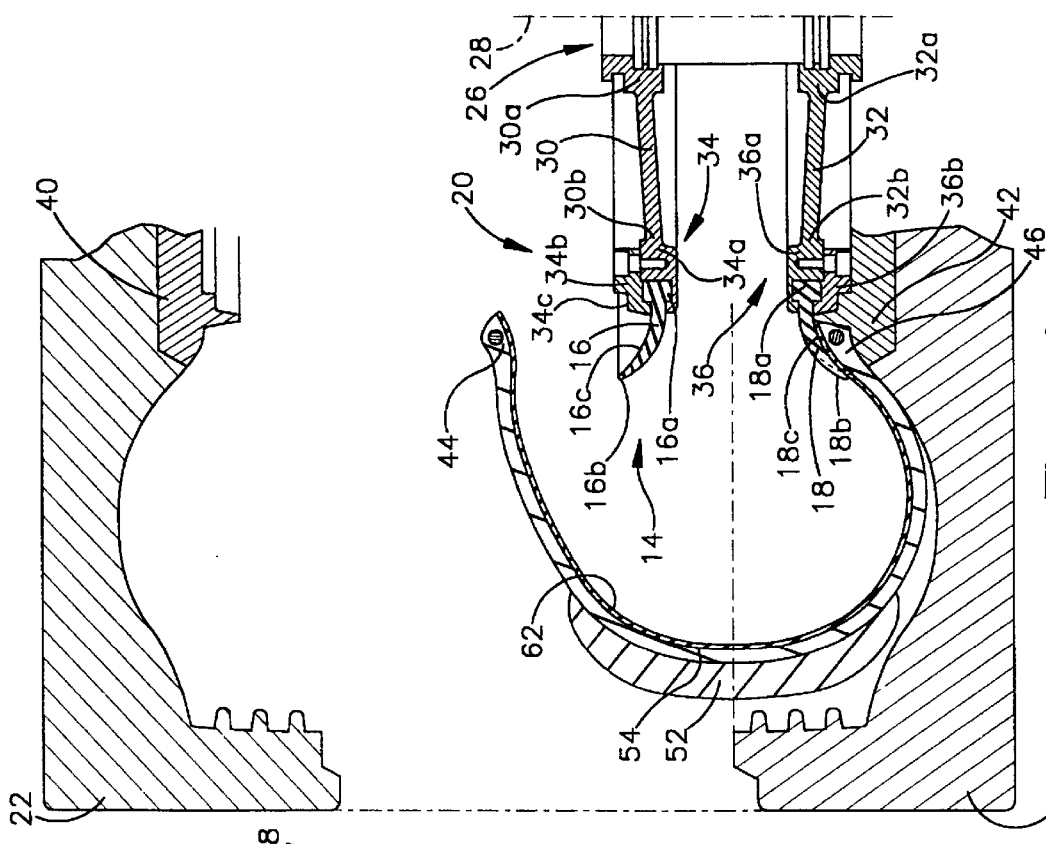
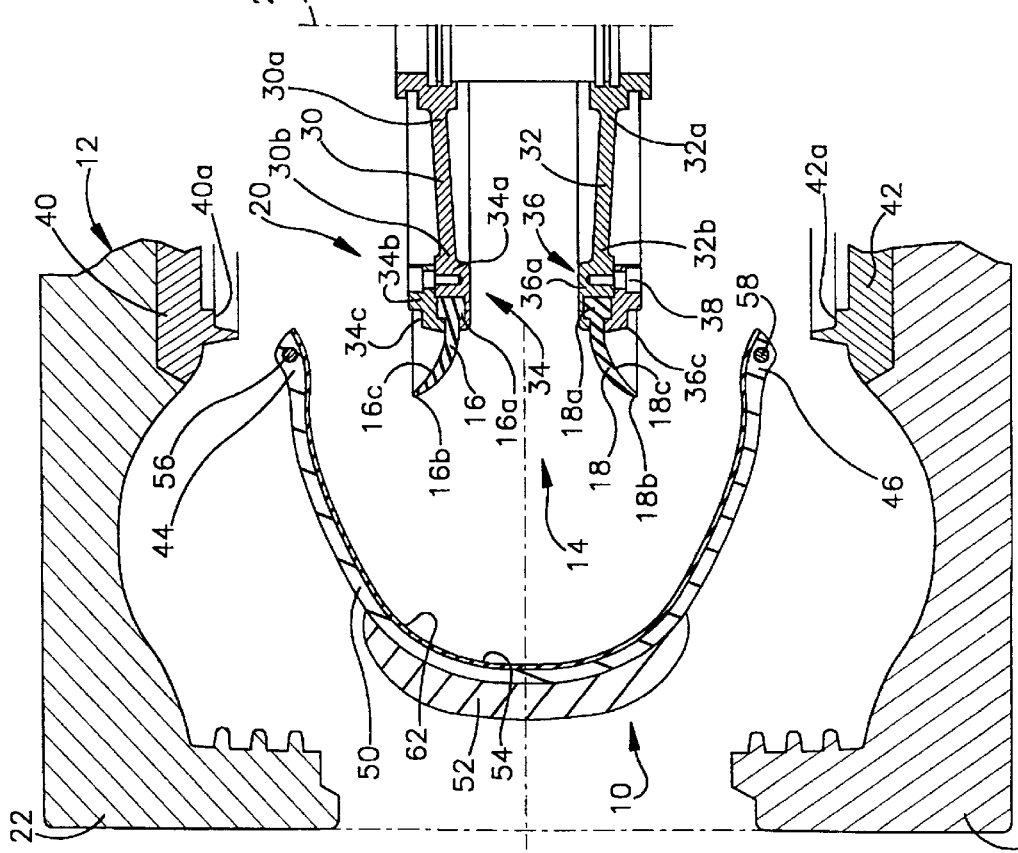
Figure 2
Figure 1

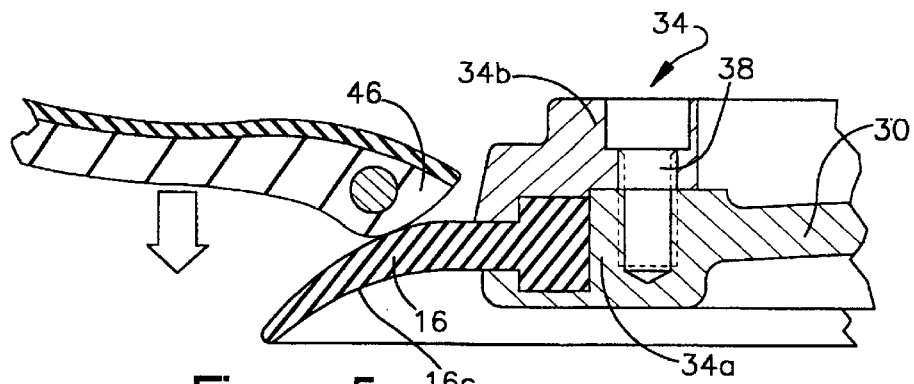
Figure 5
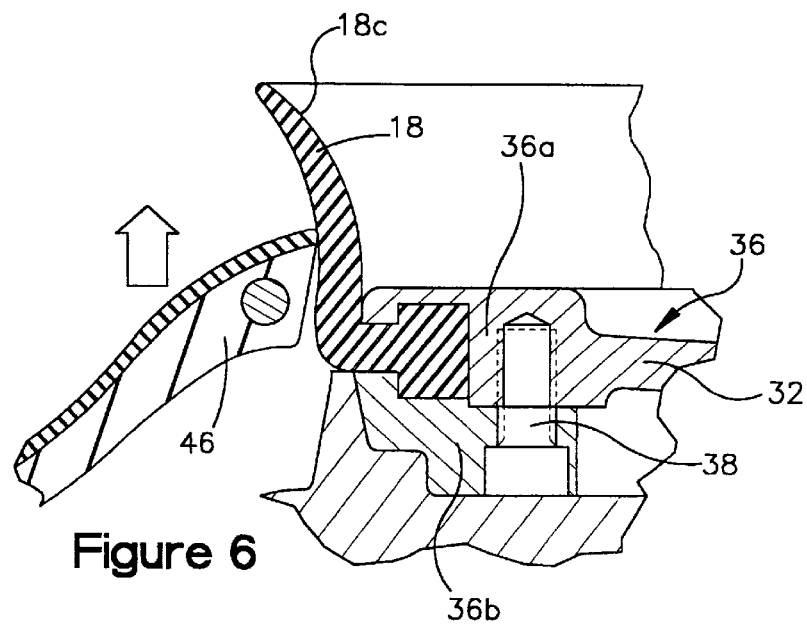
Figure 6
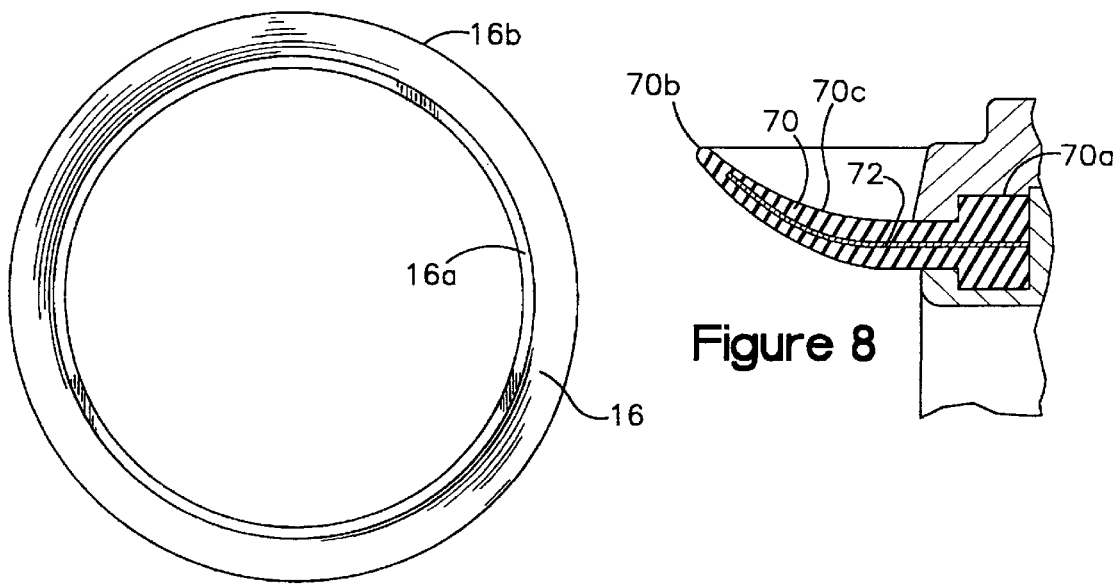
Figure 7
Figure 8

METHOD FOR BUILDING PNEUMATIC TIRES IN AN IMPROVED TIRE MOLD

RELATED APPLICATIONS

This application is related to International Application Ser. No. PCT/US97/04859 entitled PNEUMATIC TIRES WITH VULCANIZED INNERLINER AND METHOD FOR UTILIZING INNERLINER filed Mar. 25, 1997 and having a common assignor with the present application.

1. Technical Field

The present invention relates to an improved tire mold construction and to an improved method of building tires that incorporates the advantages achieved through the use of the new constructional design for the tire mold. More particularly, the present invention relates to an improved method of building tires with a tire mold for shaping and curing of tires without a tire bladder.

2. Background of the Invention

To better understand the advantages and improvements achieved with the present invention, a brief discussion of tire construction and building procedures follows. A pneumatic tire is typically constructed by applying various components, or plies of the tire as flat stock, upon a rotating tire building drum to form a hollow, toroidal shaped green or uncured tire. The order of applying the components is as follows: first, an innerliner is wrapped upon the tire building drum; the innerliner is followed by carcass plies containing tire reinforcement, the carcass plies are followed (not necessarily in the following order) by the beads, apexes, chafers, side walls, belts and tread. The components are then expanded and formed into a toroidal shaped, green tire assembly, in a manner well known in the art. The green tire assembly is then removed from the tire building drum and placed into a shaping and vulcanizing mold having the shape of the finished tire. The mold is sealed and the toroidal shaped green tire assembly is heated and expanded radially outward into the mold periphery by injecting pressurized gas or fluid into a curing bladder mounted within the mold and disposed within the green tire assembly. As the curing bladder expands, it forces the tread and sidewalls of the green tire assembly into contact with the heated mold walls to shape and vulcanize the green tire assembly into a fully vulcanized tire. During the radial expansion of the green tire assembly within the shaping and vulcanizing mold, the toroidally shaped plies expand radially outward to dimensions slightly beyond those of the original green tire assembly. Therefore, the bladder is conventionally made of an expandable elastomeric material, usually butyl rubber, for resistance to steam.

During the production of tires on an assembly line, the curing bladder within the shaping and vulcanizing mold periodically wears out or fails. This has proven to be a difficult problem to overcome because of the harsh environment and demanding operating conditions to which the elastomeric bladder is subjected, being part of an assembly line that is operating around the clock and throughout the year. For example, the bladder is located in a heated mold and is constantly being expanded and contracted for each tire built. Moreover, the bladder is being subjected to high temperature, pressurized gas or fluid, such as steam, which is used to expand the bladder.

The high paced manufacturing methods of building tires on an assembly line is limited by the time required to shape and vulcanize each green tire in the tire molds. The tire molds are very expensive and typically several tire molds are provided for each tire building drum. Still, the primary cause for downtime of the assembly line is the need to replace a defective or worn bladder in a tire mold. This fact, combined with the expense of purchasing and maintaining each of the tire molds, results in a concentrated effort by the tire industry to keep the tire molds operational. This effort is very expensive given the reduced tire production during the significant downtime that a tire mold is not operational, the labor cost for installing a new curing bladder and putting the tire mold back into operation, and the cost of manufacturing or purchasing the bladders themselves.

The tire industry has tried to eliminate the need for a curing bladder used in tire production. For example, U.S. Pat. No. 3,143,449 ('449) discloses a bladderless tire mold for curing and shaping a green tire. The green tire has an unvulcanized, barrel shaped, spliceless innerliner for completely sealing the inside of a green tire against the escape of pressurized fluid into the tire body during the vulcanizing operation in a tire vulcanizing mold. The '449 patent discloses that by eliminating the splice in the tire innerliner, the inflation fluid in a bladderless mold was unable to escape through the splice into the body of a green tire being molded and vulcanized in a tire vulcanizing mold. However, the mounting of the green tire into the mold requires a complicated mold construction that permitted the injection of inflation fluid into the tire body being molded in the bladderless mold to the desired shape.

Also pertinent to the present invention, there was disclosed in U.S. Pat. No. 4,166,883 ('883) a bladderless mold for curing tires. A bead sealing ring is inserted between the beads of the tire before the tire mold is closed, and serves as a gasket. The ring which is typically made of steel or other hard elastomeric material can include extension that are pressed inwardly by the tire as the tire mold is closed to shape the bead and form a tight seal, as illustrated in FIG. 7 of the '883 patent. The sealing ring is typically made of steel or other hard material which is flexible to the extent that it can press inwardly upon the tire to shape the bead and form a tight seal when the tire mold is closed. The problem with this tire mold construction is the degree of mechanical complexity required to insert the sealing ring between the beads of the tire after the green tire has been placed within the tire mold but before it is closed. Another significant design consideration relating to the sealing ring of the '833 patent is that the extension permit deflection of the outer surface of the member 29 from the position shown in dotted lines, to that shown in full lines, see FIG. 7 and the discussion on column 5 lines 13 through 18 of the '833 patent. Fundamentally, while the '883 patent has removed the bladder from the mold, it still requires a rather complicated mechanism for sealing the tire during the shaping and vulcanization which increases the complexity and limits the speed of the tire mold operation.

U.S. Pat. No. 4,181,483 shows an apparatus for the bellowless vulcanization of tire blanks including an elastomeric ring to seal against the tire bead.

Another design, as shown in U.S. Pat. No. 1,982,674 ('674), is the provision of a sealing ring with flexible side members that seal against the bead portions of the tire to prevent the escape of the pressurized gas or fluid. As with the '883 patent, the construction of the sealing ring disclosed in the '674 patent is cumbersome because it is mounted into the green tire prior to the placement of the green tire and sealing ring assembly into the tire mold. This assembly procedure is labor intensive and not suitable for modern, automated assembly line techniques. Also, the side members are an integral part of a rather complex sealing ring, as seen in FIG. 3, which is more prone to failure because of the harsh environment in which it is operated.

It is apparent that there is still a need to provide novel bladderless tire mold constructions and methods of operation for manufacturing tires on high speed assembly lines that reduce: a) the time and/or labor costs for mounting a green tire in a shaping and vulcanization mold; b) the downtime when a tire mold is not operational; and c) the labor and material cost for installing a new curing bladder and putting the tire mold back into operation.

OBJECTS AND SUMMARY OF THE INVENTION

It is an object of the present invention to provide a bladderless tire mold construction and method of inserting a green tire and removing a vulcanized tire from the tire mold being as defined in one or more of the appended claims and, as such, having the capability of being constructed to accomplish one or more of the following subsidiary objects.

It is yet a further object of the present invention to provide an improved method of shaping and vulcanizing tires which includes sealing rings that enable a tire to be easily and quickly installed within the tire so that the pressurized fluid used to inflate the green tire does not leak around the bead portions of the tire and escape into the tire mold cavity.

It is still another object of the present invention to provide a bladderless method of tire construction wherein the sealing rings, used to prevent the leakage of pressurized fluid from the interior of the green tire to the space between the tire and the walls of the tire mold cavity, are relatively inexpensive to manufacture and install.

It is yet another object of the invention to provide a method of mounting a green tire into a shaping and vulcanization tire mold wherein the tire can be simply inserted from the top of an open tire mold and then withdrawn in the opposite direction without the need of moving any tire mold parts into or out of the opening between the tire beads.

In accordance with the invention, there is disclosed an improved tire mold having first and second tire mold sections each having first and second bead support sections forming a mold cavity. The first and second bead support sections are spaced from each other when the first and second mold sections are sealed to provide a central opening into the mold cavity. First and second clamp rings project into the central opening through the first and second mold sections. First and second seal rings are secured at one end to the first and second clamp rings, respectively, for sealing the bead ring sections of a tire against the first and second bead support sections.

Also in a accordance with the invention, the first and second seal rings are annular shaped, flexible members each having a one annular end, forming the inner peripheral portion of the seal ring, which can be thinner than the opposite annular end forming the outer peripheral portion of the seal ring which is clamped to the clamp rings. The seal rings also can have a tapered intermediate portion extending from the thicker inner peripheral portion to the thinner outer peripheral portion.

Further in accordance with the invention, there is provided an improved method of manufacturing a tubeless, pneumatic tire using the improved bladderless tire mold with sealing rings previously described. The method includes the following steps: First, the green tire with bead containing sections is loaded into an annular tire mold cavity formed of first and second annular tire mold sections having annular bead support sections adjacent a central opening through the first and second annular tire mold sections. The bead ring sections of the tire are pressed against the first and second annular bead support sections with first and second seal rings secured to first and second seal clamp support members projecting into the central opening through the first and second tire mold sections. Then, the bead ring sections of the tire are sealed against the first and second annular bead support sections with the first and second seal rings by introducing pressurized gas or liquid through the central opening into the tire. Next, the green tire is inflated with the pressurized gas or liquid to force the tire assembly against the tire mold wall to mold and vulcanize the green tire assembly.

BRIEF DESCRIPTION OF THE DRAWINGS

FIG. 1 is a fragmentary, side elevational, broken away cross sectional view showing a green tire assembly after being initially inserted within an open bladderless, tire mold incorporating the seal rings of the present invention;

FIG. 2 is a fragmentary, side elevational, broken away cross sectional view showing a green tire assembly within an open bladderless, tire mold after the lower seal ring has been moved into engagement with the bead section of the green tire;

FIG. 5 is a fragmentary, side elevational, broken away cross sectional view showing the upper seal ring being bent under as the tire bead section of the green tire is forced over the seal ring during the mounting of the green tire into the tire mold;

FIG. 6 is a fragmentary, side elevational, broken away cross sectional view showing the lower seal ring being bent under as the lower tire bead section of the green tire is forced over the seal ring during the removal of the completed vulcanized tire from the tire mold;

FIG. 7 is a top view of the seal ring of the present invention; and

FIG. 8 is a cross sectional view of an alternative embodiment of a seal ring having an embedded metal support ring.

DETAILED DESCRIPTION OF THE INVENTION

Figure 2A:
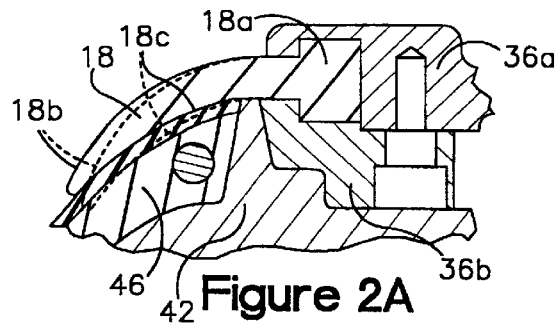
FIG. 2A is a view showing the seal ring with dotted lines in the normal position.

To best illustrate the present invention, FIG. 1 shows a green tire assembly 10 after being initially inserted within an open bladderless, tire mold 12 incorporating the seal ring assembly 14 of the present invention. An important aspect of the invention is that tire mold 12, as shown in FIG. 1, does not require the use of a curing bladder to shape the tire assembly 10. The tire mold 12, except for the seal ring assembly 14 including but not limited to the sealing rings 16 and 18 and the mounting structure 20 for the sealing rings, is constructed in any conventional manner and does not form a part of the present invention.

MOLD CONSTRUCTION

The tire mold 12 is shown with a first tire mold section 22 and a second matching tire mold section 24. While the tire mold 12 is illustrated with the first tire mold section 22 directly above and being the upper tire mold section as compared with the lower, second matching tire mold section 24, it is within the terms of the present invention to orient the tire mold sections in any other convenient orientation as long as a green tire assembly can be loaded into the tire mold and a shaped, vulcanized tire can be withdrawn from the tire mold.

The present invention is directed to the seal ring assembly 14, both structurally and the method by which it enables improved tire manufacturing processes including faster processing speed, improved tire quality, reduced tire mold complexity, reduced tire mold downtime, and reduced labor cost in tire mold maintenance. The seal ring assembly 14 includes the sealing rings 16 and 18, the mounting structure 20 for mounting the sealing rings, and any equivalent structure that performs the function of the seal ring assembly as defined herein. A center mechanism 26 which moves longitudinally in either direction along the center axis 28 carries two support arms 30 and 32. While both arms 30 and 32 are illustrated as being mounted to center mechanism 26 so that the arms move together, it is within the terms of the invention to mount the arms to that they move independent of each other. One end 30a and 32a of the support arms 30 and 32, respectively, are secured to center mechanism 26. The opposite ends 30b and 32b have clamp rings 34 and 36, respectively, extending therefrom for securing the seal rings 16 and 18, respectively. Note that the clamp rings 34 and 36 have a clamp base portion 34a and 36a, respectively, integrally attached to the support arms 30 and 32, and a removable seal attachment portion 34b and 36b, respectively, secured by conventional means, such as threaded screws 38. The seal attachment portions 34b and 36b have mating surfaces 34c and 36c, respectively, that abut against corresponding mating surfaces 40a and 42a (see FIG. 1) of the conventional mold rings or bead rings 40 and 42, which in turn are secured to the upper and lower tire mold sections 22 and 24, respectively.

The seal rings 16 and 18 are substantially identical and preferably constructed of a flexible, elastomeric material such as butyl rubber. The seal rings 16 and 18 typically have a washer like shape, as generally shown in FIG. 7 where only seal ring 16 is illustrated, with a thicker end 16a and 18a, respectively, shaped to be securely attached between the clamp base portions 34a and 36a and the removable seal attachment portions 34b and 36b, respectively. The opposite free ends 16b and 18b of seal rings 16 and 18, respectively, are illustrated as being considerably thinner then the attachment ends 16a and 18a respectively. However, the thickness of the seal rings 16 and 18 can be constant or even thicker at the outer ends 16b and 18b than the intermediate section therebetween. Note that the thickness of the seal rings 16 and 18 effect the time needed to cure the bead sections 44 and 46 of the tire. After the seal rings 16 and 18 are abutted against the bead portions 44 and 46, respectively, of the tire, curing fluid can easily force the seal rings against the inner surface of the tire assembly, as discussed in more detail below. Between the ends 16a, 18a and 16b, 18b of the seal rings 16 and 18, respectively, the seal rings 16 and 18 are formed with curved outwardly facing surfaces 16c and 18c. The radius of curvature of surfaces 16c and 18c for the seal rings 16 and 18, respectively, is generally determined so that the curved surfaces 16c and 18c are located in the mold area including the bead sections of the tire, as illustrated in dotted lines on FIG. 2A. The seal rings 16 and 18 can easily mold against the inner curved surface of the bead sections 44 and 46, respectively, of the tire assembly 10. The curved shape of the seal rings 16 and 18 creates a natural mechanical bias of the elastomeric material, i.e., it is moved away from its natural location by the insertion of the bead ring sections of the green tire against the bead rings 42 and 44 and the seals 16 and 18. Then, the pressure exerted by the vulcanizing fluid pressing the seal rings 16 and 18 against the inner curved surface of the bead sections 44 and 46 of the tire assembly 10, form an effective seal to prevent the leakage of the vulcanizing fluid therebetween.

METHOD OF OPERATION

The process begins with the tire mold 12 open, i.e. the upper tire mold section 22 spaced away from the lower tire mold section 24, and the center mechanism 26 positioned so that the lower seal 18 is spaced away from the bead ring 42. The green tire assembly 10, including a tire carcass 50 with a tread portion 52 disposed thereabout, an uncured, partially cured or completely cured innerliner 54 aligned and secured within the tire carcass, and two tire beads 56 and 58 that are located within the tire bead sections 44 and 46, respectively, is loaded downwards into the lower tire mold section 24. The ease and speed with which the tire assembly 10 can be loaded and unloaded from the tire mold is an important aspect of the present invention and a direct result of the improved seal ring assembly 14.

During the initial movement of the tire assembly 10 into the lower tire mold section 24, the tire bead section 46 (the first tire bead section to be introduced into the then open tire mold) is forced across the seal ring 16 causing the seal ring to bend downward, stretching the seal ring surface 16c out of the way of the tire bead section 46, as shown in FIG. 5. As the tire bead section 46 continues to move downward towards the lower tire mold section 24, the bead section 46 forces the seal ring 18 to bend downwards (not to the extent that seal ring 16 was bent backwards), because the natural curvature of surface 18c allows it to more easily fold over on itself. This stretching is accomplished with some ease because of the flexibility of the seal ring 16.

The ability of the seal rings 16 and 18 to bend in the opposite direction from their natural curvature is an important aspect of the invention in that it permits the tire assembly to be both loaded and unloaded extremely quickly and without the need (as required by the prior art bladderless tire molds) for any complicated mechanism or procedure to insert a seal mechanism into the green tire assembly to prevent the forming and vulcanizing pressurized media, like steam, from leaking into the tire mold cavity 60 between the tire assembly and the interior tire mold wall.

The process of loading the tire assembly 10 into tire mold 12 continues, as shown in FIG. 2, when the center mechanism 26 moves downward in the direction of the central axis 28. During the process step illustrated in FIG. 2, the clamp ring 36 seats against the bead ring 42 so that the seal ring 18 presses against the innerliner 54 of the tire assembly 10. Note that the end 18b of seal ring 18 is disposed at a location inward from the tire bead 58 towards the tire tread 52. Because of its natural curvature, the seal ring 18 forms a mechanical seal with the inner surface 62 (inner liner 54) of tire assembly 10. When the tire bead portion 46 is abutted against the bead ring 42, the tire bead portion 44 of the tire assembly 10 is located above and in spaced relation to the seal ring 16.

Figure 3:
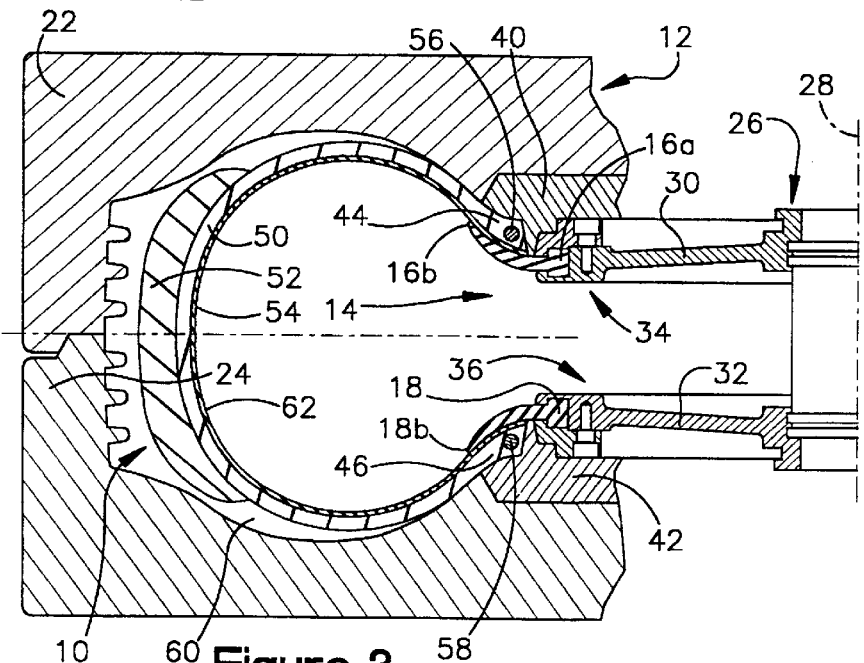
FIG. 3 is a fragmentary, side elevational, broken away cross sectional view showing a green tire assembly within a closed bladderless, tire mold incorporating the seal rings of the present invention prior to the introduction of pressurized gas to shape and vulcanize the tire.

Referring now to FIG. 3, the upper tire mold section 22 is next lowered into sealing engagement with the lower tire mold section 24 to form the tire mold cavity 60 which encompasses the tire assembly 10. As the upper tire mold section 22 moves towards the lower tire mold section 24, the bead ring 40 engages the tire bead portion 44 containing the tire bead 56 and moves the tire bead portion downward until the bead ring 40 is abutted against the clamp ring 34. The seal ring 16 then forms a mechanical seal against the inner surface 62, i.e. inner liner 54, of the tire assembly 10 in the same way as described with regard to the seal ring 18.

Figure 4:
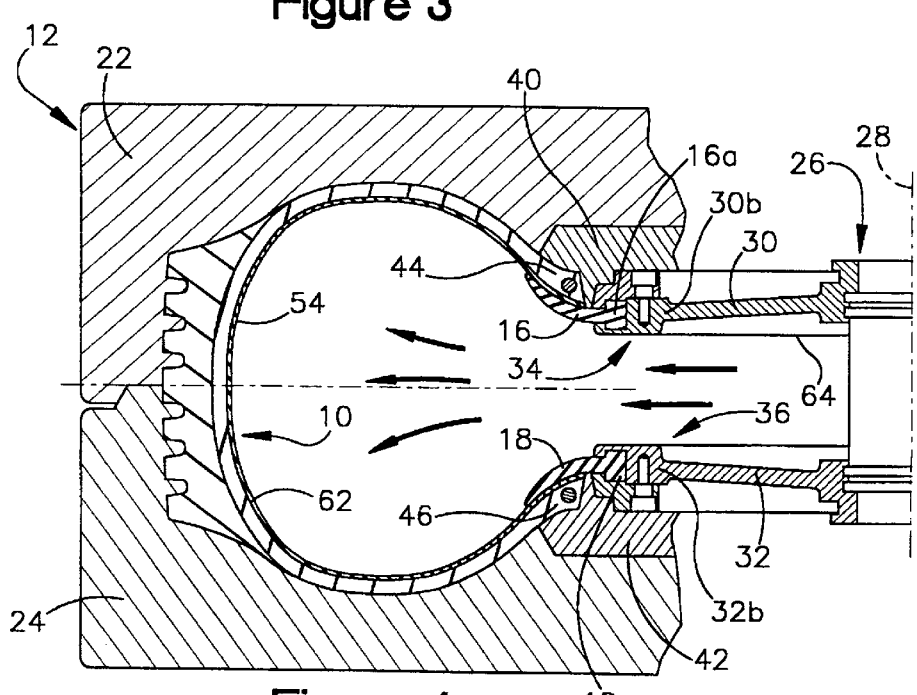
FIG. 4 is a fragmentary, side elevational, broken away cross sectional view showing a green tire assembly within a closed bladderless, tire mold incorporating the seal rings of the present invention after the pressurized gas has shaped and vulcanized the tire.

Referring now to FIG. 4, the closed tire mold 12 with the tire assembly 10 is illustrated with the pressurized curing and shaping fluid or liquid being directed through an inlet passageway 64 disposed between the support arms 30 and 32. This pressurized fluid forces the tire assembly 10 against the tire mold walls. It can be understood that the fluid or liquid pressure, typically steam or hot gas pressure presses the seals 16 and 18 against the inner surface 62 of the tire bead sections 44 and 46 of the tire to effect a very strong seal that prevents any leakage of the fluid or liquid into the tire mold cavity 60 between the tire assembly 10 and the interior tire mold surface.

After the green tire assembly 10 has been shaped and vulcanized, the curing and shaping fluid is exhausted through an outlet port (not shown) typically located between the support arms 30 and 32. Then, the upper mold section 22 is moved upward and out of the way. Again, the center mechanism 26 is moved along central axis 28 away from the lower tire mold section 24 so that the seal 18 is moved out of the engagement with the bead ring portion 46 of the now cured tire. Nevertheless, as the curved tire is removed from the tire mold by conventional means, the seal ring 18 is bent backwards as shown in FIG. 6, with the end 18b being forced upwards so that the tire bead section 46 moves upward and can move free from the seal ring 42 as the tire is removed from the tire mold 12. As the tire continues to move further out of the tire mold, the bead ring section 46 also crosses the upper seal ring 16. However, because of the flexibility of the seal ring 16, the bead ring section 46 moves past the upper seal ring without much difficulty.

The ability of the seal rings 16 and 18 to operate in the harsh environment of the heated tire mold, with the tires continually moving across the seal rings, as they are loaded and unloaded from the tire mold, is a significant feature of the present invention. That is, that the seal rings 16 and 18 are flexible enough to enable the tire to be simply and quickly inserted downward into the tire mold and then removed from the tire mold without requiring any adjustment in the location of the seal rings except for a small amount of vertical movement which is easily handled by the center mechanism 26. Further, when the seal rings 16 and 18 are worn out by the constant flexure from moving the bead ring portions 44 and 46 of the tire assembly 10 across the seal rings, the downtime to replace them is minimal because the seal rings are flexible and easily removed and replaced between the clamp rings 34 and 36 and the support arms 30 and 32, respectively, as discussed hereinbefore.

ALTERNATIVE EMBODIMENT

While the seal rings 16 and 18 are effective to seal against the bead sections of the tire, it is also within the terms of the invention to mold a washer shaped, metal insert 72 within the seal ring 70, as illustrated in FIG. 8. The metal insert 72 provides additional strength for the thinner sections of the otherwise elastomeric seal rings.

The seal ring 70 can be generally constructed in accordance with the principles discussed above with respect to seal rings 16 and 18, i.e., of the same material and shape except for the embedded insert 72. The modified seal ring 70 can replace the seal rings 16 and 18, as desired. The embedded metal washer 72 can be formed of a flexible metal, such as spring steel, that enables the seal ring 70 to bend so that the bead sections of the tire assembly can move across the seal ring 70 in the manner described herein before. The metal insert 72 provides an increased bias of the seal ring 70 during the initial contact with the inner surface of the tire bead portions to prevent the pressurized shaping and vulcanizing media, i.e. the steam, from leaking between the seal ring 70 and the inner surface of the tire assembly during the initial injection of the pressurized media into the tire assembly. While the metal insert 72 is illustrated as extending from one end 70a of the seal ring to a location near the opposite end 70b of the seal ring, it is also within the terms of the invention to lengthen or shorten the insert 72 to provide a balance of good sealing qualities with the flexibility needed to move as the bead sections of the tire assembly cross the seal ring.

It is apparent that there has been provided in accordance with this invention a bladderless tire mold and method of operating the tire mold that satisfy the objects, means and advantages set forth hereinbefore. According to the invention, a bladderless tire mold includes sealing rings that enable a tire to be easily and quickly installed within the tire mold so that the pressurized gas or fluid used to inflate and vulcanize a green tire assembly does not leak around the bead portions of the tire and escape into the mold cavity. A method of mounting a green tire into the bladderless tire mold allows the tire to be quickly and easily loaded in and unloaded from the mold without the need of moving any mold parts into or out of the space between the tire beads.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A method of manufacturing a pneumatic tire in a tire mold having upper and lower mold sections forming a mold cavity, each of the upper and lower mold sections having upper and lower mold rings adjacent an opening into the mold cavity, the method including:

providing a seal ring assembly including first and second clamp rings projecting into the mold cavity opening and having first and second elastomeric seal rings secured to the first and second clamp rings, respectively, so that the free ends of the first and second elastomeric seal rings extend into the mold cavity for sealing first and second tire bead sections of a tire assembly against the upper and lower mold rings, respectively;

loading the tire assembly into the lower mold section while spaced away from the upper mold section by forcing the second tire bead section across the first and second elastomeric seal rings causing the first and second elastomeric seal rings to bend downward, stretching the free ends of the first and second elastomeric seal rings out of the way of the second tire bead section until the second tire bead section is against lower mold ring;

sealing the second tire bead section against the lower mold ring by abutting the second elastomeric seal ring against the second tire bead section; and lowering the upper mold section into sealing engagement with the lower mold section while the upper mold ring engages the first tire bead section and moves the first tire bead section downward until the first elastomeric seal ring forms a seal against the first tire bead section.

2. The method of manufacturing as set forth in claim 1 further characterized by:

moving the upper mold section upward and away from the lower mold section and moving the second elastomeric seal ring out of engagement with the second tire bead section;

removing the tire assembly from the tire mold so that the second elastomeric seal ring is bent backwards with the free end being forced upwards so that the second tire bead section moves upward and free from the lower mold ring as the tire assembly is removed from the tire mold; and moving the tire assembly further out of the tire mold causing the first tire bead section to cross the first elastomeric seal ring.

3. The method of manufacturing as set forth in claim 2 further characterized by:

moving the upper and lower mold sections away from the first and second elastomeric seal rings to enable a next tire assembly to be inserted downward into the tire mold and then removed from the tire mold without moving the first and second elastomeric seal rings into and out of the mold cavity.

\* \* \* \* \*